(12) United States Patent
Frenal et al.

(10) Patent No.: US 11,378,213 B2
(45) Date of Patent: Jul. 5, 2022

(54) DEVICE FOR SUPPLYING PRESSURIZED FLUID, AND PRESSURIZED FLUID CYLINDER(S) COMPRISING SUCH A DEVICE

(71) Applicant: L'Air Liquide, Société Anonyme pour l'Etude et l'Exploitation des Procédés Georges Claude, Paris (FR)

(72) Inventors: Antoine Frenal, Ezanville (FR); Herve Paoli, Rueil-Malmaison (FR); Benjamin Fischer, Fresnes (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/794,539

(22) Filed: Feb. 19, 2020

(65) Prior Publication Data
US 2020/0263819 A1 Aug. 20, 2020

(30) Foreign Application Priority Data
Feb. 20, 2019 (FR) ...................................... 1901688

(51) Int. Cl.
*F16L 37/00* (2006.01)
*F16L 37/244* (2006.01)
(Continued)

(52) U.S. Cl.
CPC .......... *F16L 37/2445* (2013.01); *F17C 13/04* (2013.01); *F17C 13/12* (2013.01);
(Continued)

(58) Field of Classification Search
CPC ....... F16L 37/2445; F17C 13/04; F17C 13/12; F17C 2201/0109; F17C 2201/056;
(Continued)

(56) References Cited

U.S. PATENT DOCUMENTS 3,216,466 A * 11/1965 Simko ..................... F16K 13/06
141/226
3,378,032 A * 4/1968 Harmand ................ F16K 1/307
137/613

(Continued)

FOREIGN PATENT DOCUMENTS

FR 2 892 799 5/2007
FR 2 991 750 12/2013
(Continued)

OTHER PUBLICATIONS

French Search Report and Written Opinion for corresponding FR 1901688, dated Oct. 25, 2019.

*Primary Examiner* — Minh Q Le
(74) *Attorney, Agent, or Firm* — Elwood L. Haynes

(57) ABSTRACT

Device for supplying pressurized fluid, including a first valve housing an internal fluid circuit, the device including a second valve having an internal circuit and forming a physical entity distinct from the first valve. The first and the second valve including respective coupling members forming a detachable male/female quick-connection system for the second valve on the first valve. The two valves being configured such as to place their internal circuits in communication when the second valve is coupled to the first valve via the quick-connection system.

5 Claims, 3 Drawing Sheets

(51) Int. Cl.
*F17C 13/04* (2006.01)
*F17C 13/12* (2006.01)

(52) U.S. Cl.
CPC ............... *F17C 2201/0109* (2013.01); *F17C 2201/056* (2013.01); *F17C 2201/058* (2013.01); *F17C 2203/0617* (2013.01); *F17C 2205/0308* (2013.01); *F17C 2205/0326* (2013.01); *F17C 2205/0329* (2013.01); *F17C 2205/0335* (2013.01); *F17C 2205/0338* (2013.01); *F17C 2205/0385* (2013.01); *F17C 2223/0123* (2013.01); *F17C 2223/036* (2013.01); *F17C 2227/044* (2013.01); *F17C 2227/048* (2013.01); *F17C 2250/043* (2013.01); *F17C 2250/0426* (2013.01)

(58) Field of Classification Search
CPC ........ F17C 2201/058; F17C 2203/0617; F17C 2205/0308; F17C 2205/0326; F17C 2205/0329; F17C 2205/0335; F17C 2205/0338; F17C 2205/0385; F17C 2223/0123; F17C 2223/036; F17C 2227/044; F17C 2227/048; F17C 2250/0426; F17C 2250/043
USPC ............... 137/329.1, 384.2, 614.05, 614.06; 141/346, 349, 350, 351
See application file for complete search history.

(56) References Cited

U.S. PATENT DOCUMENTS

| | | | | |
|---|---|---|---|---|
| 3,473,569 A | * | 10/1969 | Murray | F16L 37/36 137/614.06 |
| 3,646,965 A | * | 3/1972 | Swartz | G05D 7/0106 137/614.06 |
| 4,235,267 A | * | 11/1980 | Brake | F16L 37/252 141/293 |
| 4,347,870 A | * | 9/1982 | Maldavs | F16L 37/23 137/614.05 |
| 6,408,880 B1 | * | 6/2002 | Kaul | F16L 37/23 137/614.05 |
| 7,360,976 B2 | * | 4/2008 | Bryan | B23B 31/261 137/238 |
| 7,766,039 B2 | * | 8/2010 | Zuck | F16L 37/127 137/614.04 |
| 8,353,314 B2 | * | 1/2013 | Radford | F17C 13/04 137/614.05 |
| 8,720,487 B2 | * | 5/2014 | Cooley | F16L 37/34 137/614.05 |
| 8,869,845 B2 | * | 10/2014 | Moretti | F17C 13/04 141/197 |
| 8,899,262 B2 | * | 12/2014 | Wadham | F16K 35/00 137/492.5 |
| 10,711,947 B2 | * | 7/2020 | Paoli | F17C 13/04 |
| 2008/0308181 A1 | | 12/2008 | Denis et al. | |
| 2009/0223976 A1 | * | 9/2009 | Denis | F16K 1/306 220/565 |
| 2018/0038552 A1 | * | 2/2018 | Frenal | F17C 7/00 |
| 2018/0045373 A1 | | 2/2018 | Frenal | |
| 2019/0219227 A1 | * | 7/2019 | Frenal | F17C 13/04 |
| 2019/0242528 A1 | * | 8/2019 | Frenal | F17C 13/04 |
| 2020/0240524 A1 | * | 7/2020 | Vignerol | F17C 1/00 |
| 2020/0256516 A1 | * | 8/2020 | Ligonesche | F17C 13/04 |
| 2020/0256517 A1 | * | 8/2020 | Ligonesche | F17C 13/04 |
| 2020/0370694 A1 | * | 11/2020 | Frenal | F16L 37/08 |

FOREIGN PATENT DOCUMENTS

| | | |
|---|---|---|
| FR | 3 033 388 | 9/2016 |
| FR | 3 054 291 | 1/2018 |
| FR | 3 056 278 | 3/2018 |

\* cited by examiner

[Fig. 1]
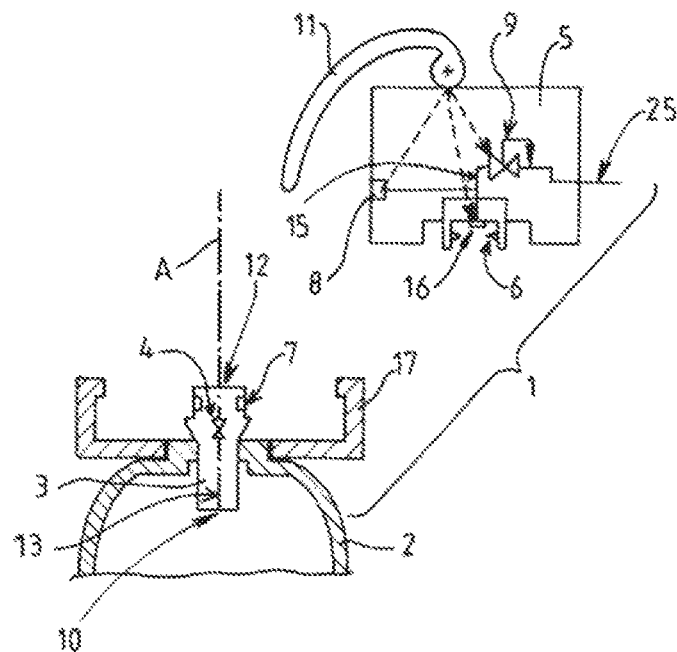
[Fig. 2]
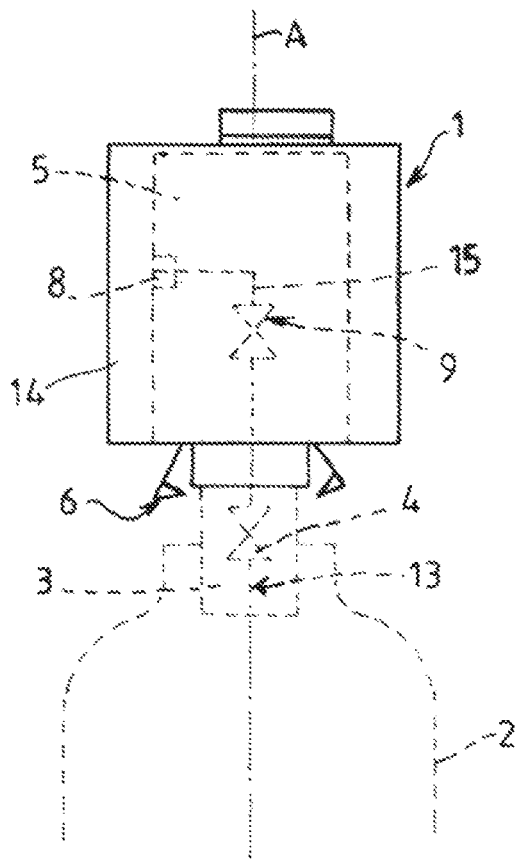

[Fig. 3]
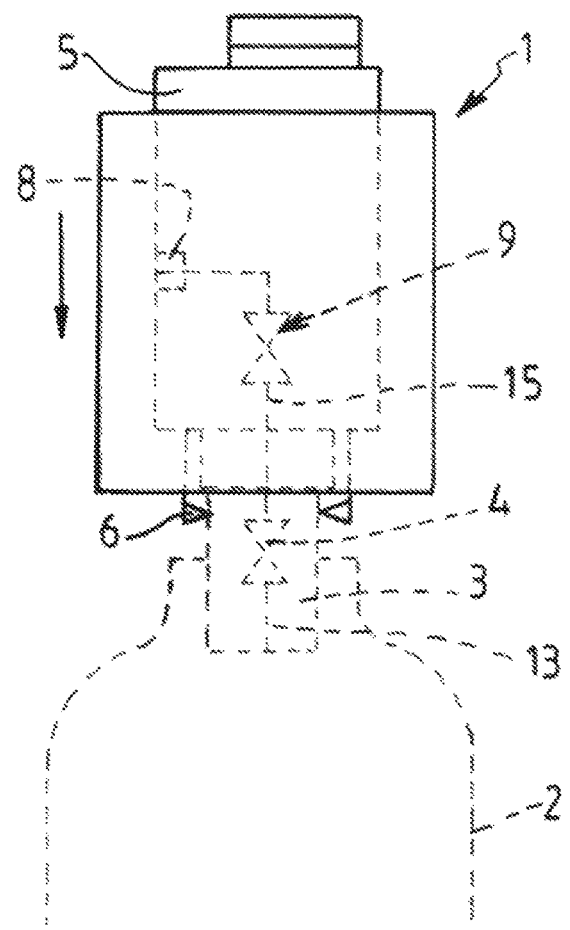
[Fig. 4]
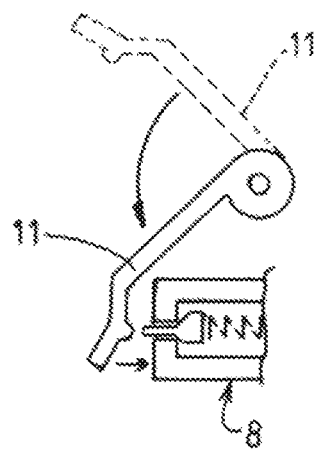

[Fig. 5]
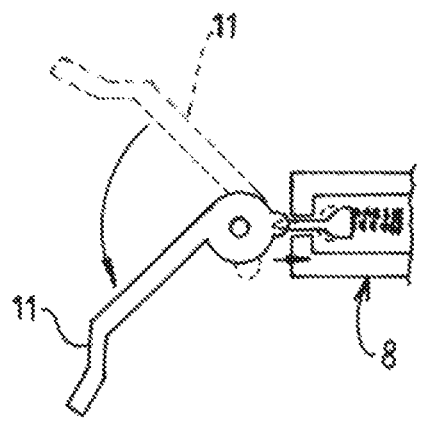
[Fig. 6]
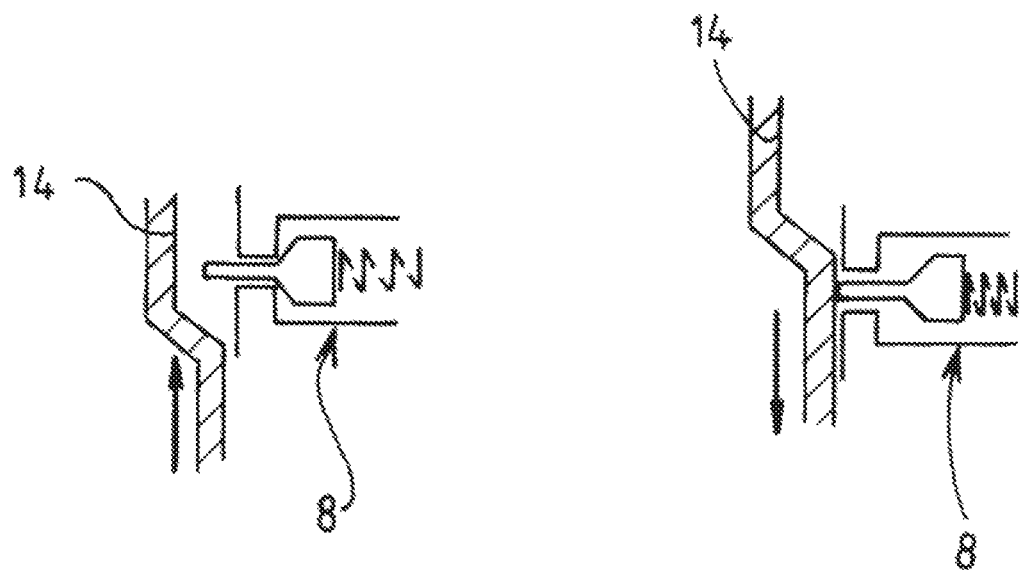

DEVICE FOR SUPPLYING PRESSURIZED FLUID, AND PRESSURIZED FLUID CYLINDER(S) COMPRISING SUCH A DEVICE

CROSS REFERENCE TO RELATED APPLICATIONS

This application claims priority to French Patent Application No. 1901688, filed Feb. 20, 2020, the entire contents of which are incorporated herein by reference.

BACKGROUND

The invention relates to a device for supplying pressurized fluid, and a pressurized fluid cylinder or an array of pressurized fluid cylinders provided with such a device.

The invention relates more particularly to a device for supplying pressurized fluid, notably pressurized gas, comprising a first valve housing an internal fluid circuit, the device comprising a second valve comprising an internal circuit and forming a physical entity distinct from the first valve, the first and the second valve comprising respective coupling members forming a detachable male/female quick-connection system for the second valve on the first valve, the two valves being configured such as to place their internal circuits in communication when the second valve is coupled to the first valve via the quick-connection system, the internal circuits comprising an array of control valve(s) for controlling the circulation of the fluid towards an outlet, the device comprising at least one manually actuatable movable command member for commanding the array of control valve(s) and/or the quick-connection system, the device comprising a member for purging one at least of the internal circuits, the purge member being in communication with the internal circuit or circuits on the one hand and with an exterior discharge zone, such as the atmosphere, on the other, the purge member being movable between a closed state preventing purging of the internal circuit or circuits towards the discharge zone and an open state allowing purging of the internal circuit or circuits towards the discharge zone.

The invention relates in particular to a device comprising an item of equipment that is connected to the valve of a pressurized gas cylinder using a quick connection.

Quick connectivity is subject to high pressure when the circuits of the valve and of the item of equipment are at high pressure (i.e. when the take-off/filling circuits are connected to the pressure source). Thus, for technical and safety reasons, disconnection of the item of equipment and the valve to which it is connected is not possible when the whole is under pressure. It is necessary to make provision for the depressurization/purging of these sealed circuits to allow the physical separation of the two entities. In effect, even after closure of the valves/check valves of the circuits, these latter contain fluid at high pressure.

A known solution for achieving this purging/depressurization without completely emptying the cylinder consists in using the (downstream) outlet of the item of equipment to evacuate the pressurized gas trapped in the device. This downstream outlet may be relatively remote from the cylinder. This requires the user to make several trips to-and-fro: to close the cylinder, then to go and purge the installation at the far end, and then to return in order to disconnect the item of equipment.

Another known solution consists in providing a purge valve independent of the closure means of the packaging.

These two solutions present the drawback whereby closing the cylinder at the time of purging may be forgotten, which will empty the cylinder completely.

SUMMARY

An object of the present invention is to palliate all or some of the above-mentioned prior-art drawbacks.

To that end, the device according to the invention, which in other respects is in accordance with the generic definition thereof given in the above preamble, is essentially characterized in that the purge member can be actuated to its open state by the at least one command member.

Furthermore, embodiments of the invention may comprise one or more of the following features:

- the purge member can be actuated to its open state by the at least one command member upon a movement of said command member into a position that commands the closure of at least one control valve of the array of control valve(s) and/or upon a movement of the command member into a position that commands an unlocking or a separation of the respective coupling members of the quick-connection system,
- the purge member is actuated necessarily and automatically to its open state by the at least one command member upon a movement of the movable command member into a position that commands the closure of at least one control valve of the array of control valve(s) and/or upon a movement of the movable command member into a position that commands an unlocking or a separation of the respective coupling members of the quick-connection system,
- the purge member comprises a check valve urged into a closure position against a seat by a return member,
- the at least one command member capable of actuating the purge member comprises a button or lever that is movable in translation and/or in rotation such as to command the opening/the closing of at least one valve of the internal circuit of the first valve and/or of the second valve,
- the at least one command member capable of actuating the purge member comprises a member that is movable in translation and/or in rotation such as to command the locking/the unlocking of the mechanical link of the coupling members of the quick-connection system,
- the internal circuit of the first valve extends between a first, upstream end designed to be in communication with a source of pressurized fluid and a downstream end, the internal circuit of the first valve comprising an isolation valve for opening or closing the internal circuit, the second valve being provided with an internal fluid circuit comprising an upstream end designed to be in communication with the downstream end of the internal circuit of the first valve when the second valve is coupled to the first valve and a downstream, outlet end designed to be connected to an apparatus that uses the fluid, the second valve comprising a movable member for actuating the isolation valve of the first valve such as to command the opening or the closing of the latter,
- the movement of the movable member for actuating the isolation valve of the first valve is commanded by the at least one command member,
- the device has a member for locking/unlocking the mechanical connection of the coupling members of the quick-connection system, the locking/unlocking member being movable relative to the first and second valves between a first, locking position and a second, unlocking position, in the first, locking position of the locking member preventing, when the two valves are coupled, the separation of the second valve from the first valve, and in the second, unlocking position of the locking/unlocking member allowing, when the two valves are coupled, the separation of the second valve from the first valve, said locking/unlocking member constituting a command member actuating the purge member, the purge member being actuated to its open state in the course of the movement of the locking/unlocking member from its first position towards its second position and/or when the locking/unlocking member reaches its second position, the purge member may be actuated by the locking/unlocking member by means of mechanical contact, the at least one command member comprises a pivoting lever, and in that the purge member may be actuated by means of mechanical contact with a portion of said lever, the purge member may be actuated by the lever in its travel between two specific positions of command of the array of valve(s), the purge member may be actuated by the lever when the lever is moved beyond its travel between two specific positions of command of the array of valve(s), the quick-connection system mechanically blocks the second valve on the first valve at least along a longitudinal axis (A), the first valve comprises a cylindrical end extending along a longitudinal axis, the quick-connection system comprising at least one groove or rib formed on the cylindrical end of the first valve and a system of coupling balls or claws that is secured to the second valve and interacts with the at least one groove or rib formed on the cylindrical end of the first valve, the internal circuit of the second valve comprises a downstream end provided with an outlet coupling that opens onto the peripheral surface of the second valve, the device comprises a pressurized fluid cylinder to which the first valve is connected, the device further comprising a cap for protecting the first valve fixed rigidly to the cylinder, in the connected position of the second valve on the first valve, the quick-connection system allows the second valve to rotate on the first valve about the longitudinal axis and relative to the cap.

The invention also relates to a pressurized fluid cylinder or array of pressurized fluid cylinders provided with a device according to any one of the above or following features.

The invention may also relate to any alternative device or method comprising any combination of the features above or below within the scope of the claims.

BRIEF DESCRIPTION OF THE DRAWINGS

Further particular features and advantages will become apparent from reading the following description, which is given with reference to the figures, in which:

FIG. 1 shows a schematic and partial view in cross section, illustrating an exemplary embodiment of a device for supplying fluid in a disconnected or separated state, in accordance with one embodiment of the present invention.

FIG. 2 shows a schematic and partial view in cross section, illustrating a use configuration of a device for supplying fluid in a coupled and not connected state, in accordance with one embodiment of the present invention.

FIG. 3 shows a view similar to that of FIG. 2 of a use configuration of the device (connected state) in accordance with one embodiment of the present invention.

FIG. 4 shows a schematic and partial view of a detail of the device illustrating one example of the structure and operation of a purge system of the device, in accordance with one embodiment of the present invention.

FIG. 5 shows a schematic and partial view of a detail of the device illustrating another example of the structure and operation of a purge system of the device, in accordance with one embodiment of the present invention.

FIG. 6 shows a schematic and partial view of a detail of the device illustrating another example of the structure and operation of a purge system of the device, in accordance with one embodiment of the present invention.

DETAILED DESCRIPTION OF THE PREFERRED EMBODIMENTS

FIG. 1 shows a device 1 for supplying pressurized fluid, notably pressurized gas, comprising a first valve 3 mounted in the orifice of a tank 2 and surrounded by protective cap 17.

The first valve 3 accommodates an internal fluid circuit 13 provided with at least one isolation member 4 for opening or closing the internal circuit 13. The isolation member 4 is a check valve or an isolation valve, for example.

The device 1 comprises a second valve 5 forming a distinct (separable) physical entity from the first valve 3 (and in a disconnected position in FIG. 1 and in a connected/coupled position in FIG. 2 and FIG. 3).

The second valve 5 is provided with an internal fluid circuit 15 comprising a first, upstream end designed to be fluidically connected to a downstream end 12 of the internal circuit 13 of the first valve 3.

The internal circuit 13 of the second valve 5 comprises, for example, at least one member 9 for controlling the flow of fluid (for example, a fixed or adjustable pressure release device and/or a flow rate regulator and/or a residual pressure valve (RPV) and/or a non-return valve (NRV) and/or any other appropriate member, calibrated orifice, etc.). The second valve 5 preferably also comprises a movable member 16 for actuating the isolation member 4 of the first valve 3 such as to command the opening or the closing of the latter. For example, the movable actuating member 16 comprises a flapper commanded by a manual command member 11 carried by the second valve 5 (a lever 11 in this example, but could comprise a push-button, a handwheel or any other appropriate member). The lever 11 may, if necessary, control the member 9 for controlling the flow of fluid.

The first valve 3 and the second valve 5 comprise respective coupling members 6, 7 that form a detachable male/female quick-connection/coupling system for removably connecting/coupling the second valve 5 to the first valve 3.

For example, the first valve 3 comprises a cylindrical terminal end, extending along a central longitudinal axis A, to which the second valve 5 is connected. The quick-connection system may comprise at least one groove 7 or rib formed on the cylindrical end of the first valve 3 and a system of claws 6, balls (or any appropriate equivalent coupling element) secured to the second valve 5.

The coupling element(s) 6 of the second valve 5 are preferably movable and can be locked/unlocked by, for example, a movable locking member 14 on the second valve 5 (cf. FIG. 2 and FIG. 3). The coupling element(s) 6 of the second valve 5 interact with the at least one groove or rib 7 formed on the cylindrical end of the first valve 3.

The device 1 comprises a member 8 for purging one at least of the internal circuits 13, 15. For example, as illustrated in FIG. 1, FIG. 4, FIG. 5 and FIG. 6, the purge member 8 may comprise a check valve urged into a closure position against a seat by means of a return member. The purge member 8 is, for example, located on the second valve 5 and is in communication with the internal circuit 15 on the one hand and with an exterior discharge zone, such as the atmosphere (the outside) on the other. This purge member 8 is movable between a closed state preventing the purging of the internal circuits 13, 15 towards the discharge zone and an open state allowing the purging of the internal circuits 13 towards the discharge zone.

According to an advantageous particular feature, the purge member 8 may be actuated to its open state by the at least one command member 11, 14 (lever 11 and/or the locking/unlocking member 14).

Preferably, the purge member 8 is distinct from the array of control valve(s) 4, 9 that regulate/control the passage of fluid between the two ends 10, 25 of the circuits. That is to say, the purge member 8 is a depressurization check valve distinct from the check valves that regulate normal take-off towards the outlet 25 of the second valve 5.

In particular, the purge member 8 may be located upstream or downstream of the control member 9 (when one of the latter is present), depending on the operational advantages and drawbacks of the application.

The purge member 8 may be actuatable/actuated to its open state by the lever 11 upon a movement of said lever 11 towards a position that commands the closure of at least one valve 4 of the array of valve(s).

By the same token (alternatively or cumulatively), the purge member 8 may be actuatable/actuated to its open state by the locking member 14 upon a movement of this locking member 14 into a position that commands an unlocking of the respective coupling members 6, 7 of the quick-connection system (FIG. 2 illustrates an unlocking position, whilst FIG. 3 illustrates a locking position).

For example, the device may be configured such that the purge member 8 is necessarily and automatically actuated to its open state by the lever 11 upon a movement of the lever 11 such as to command the closure of at least one valve 4 of the array of valve(s). This is illustrated in FIG. 5, in which the movement of the lever 11 from the open position (lever 11 at the top, in broken lines in the figure, for example) towards the closure position (lever at the bottom in FIG. 5, for example) passes necessarily via an intermediate position (preferably, close to or the same as the closure position), in which the purge member 8 is open. As illustrated in FIG. 5, this may be achieved via an interaction between the lever 11 (a portion of the lever 11, such as a cam-like pivoting end) and an end of the purge member. This gives rise to an opening of the purge member 8, at least in one position, that is sufficient to lower the pressure in the internal circuits 15, 13.

In another possible configuration (cf. FIG. 4), the purge member 8 may be actuated by the lever 11 when the lever 11 is moved beyond its travel between two specific positions of command of the array of valve(s). For example, beyond its normal closure position (towards the bottom in the example of FIG. 5), the lever may be moved further (for example, pushed) such as to push/actuate the command member 8 into its open position).

By the same token (alternatively or cumulatively), the device may be configured such that the purge member 8 is necessarily and automatically actuated to its open state by the locking member 14 upon a movement of the locking member 14.

As illustrated in FIG. 6, when the locking member 14 is moved from its locking position (on the left in FIG. 6) towards its unlocking position (on the right in FIG. 6) this locking member 14 also actuates the purge member 8 to open, at least in one position. In this example; the locking member 14 is movable in translation on the second valve 5.

Thus, this purging may be obtained only when the lever 11 is in the closure position of the circuit 15, 13 (additional travel after the closure position, as illustrated in FIG. 4, i.e. pushed in the opposite direction from the movement towards the open position). This purging requires a deliberate action on the part of the user.

Similarly, purging may be "automatic" and included in the closure movement of a check valve of the circuit 13, 15 (cf. the embodiment of FIG. 5).

Lastly, this "automatic" purging may likewise be included in the disconnection movement (cf. the embodiment of FIG. 6): by moving the unlocking member 14 to unlock the link between the two valves 3, 5, the user automatically actuates the purge member 8).

These solutions ensure effective purging without risking emptying the cylinder 2 completely.

As detailed in document FR3054291A1, the quick-connection system may be configured (for example, clearance, deflections, etc.) in such a manner that when the fluid pressure in the circuits 13, 15 of the two connected valves 3, 5 exceeds a specific pressure level (open circuit) the quick-connection system 6, 7 experiences a force that tends to limit or to prevent the relative rotation of the second valve 5 on the first valve 3. For example, rotation is permitted only when the internal circuit 15 of the second valve 5 is not under pressure (check valve(s) closed, and circuit purged).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for supplying pressurized fluid, comprising a first valve housing an internal fluid circuit, the device comprising a second valve comprising an internal circuit and forming a physical entity distinct from the first valve, the first and the second valve comprising respective coupling members forming a detachable male/female quick-connection system for the second valve on the first valve, the two valves being configured such as to place their internal circuits in communication when the second valve is coupled to the first valve via the quick-connection system, the internal circuits comprising an array of control valve(s) for controlling the circulation of the fluid towards an outlet the device comprising at least one manually actuatable movable command member for commanding the array of control valve(s) and/or the quick-connection system, the device comprising a member for purging one at least of the internal circuits, the purge member being in communication with the internal circuit or circuits on the one hand and with an exterior discharge zone, such as the atmosphere, on the other, the purge member being movable between a closed state preventing purging of the internal circuit or circuits towards the discharge zone and an open state allowing purging of the internal circuit or circuits towards the discharge zone, wherein the purge member comprises a check valve urged into a closure position against a seat by a return member, and in that the purge member can be actuated to its open state by the at least one manually actuatable movable command member, wherein the at least one manually actuatable movable command member capable of actuating the purge member comprises a button or lever that is movable in translation and/or in rotation such as to command the opening/the closing of at least one valve of the internal circuit of the first valve and/or of the second valve.

2. A device for supplying pressurized fluid, comprising a first valve housing an internal fluid circuit, the device comprising a second valve comprising an internal circuit and forming a physical entity distinct from the first valve, the first and the second valve comprising respective coupling members forming a detachable male/female quick-connection system for the second valve on the first valve, the two valves being configured such as to place their internal circuits in communication when the second valve is coupled to the first valve via the quick-connection system, the internal circuits comprising an array of control valve(s) for controlling the circulation of the fluid towards an outlet the device comprising at least one manually actuatable movable command member for commanding the array of control valve(s) and/or the quick-connection system, the device comprising a member for purging one at least of the internal circuits, the purge member being in communication with the internal circuit or circuits on the one hand and with an exterior discharge zone, such as the atmosphere, on the other, the purge member being movable between a closed state preventing purging of the internal circuit or circuits towards the discharge zone and an open state allowing purging of the internal circuit or circuits towards the discharge zone, wherein the purge member comprises a check valve urged into a closure position against a seat by a return member, and in that the purge member can be actuated to its open state by the at least one manually actuatable movable command member, wherein the at least one manually actuatable movable command member capable of actuating the purge member comprises a member that is movable in translation and/or in rotation such as to command the locking/the unlocking of the mechanical link of the coupling members of the quick-connection system.

3. A device for supplying pressurized fluid, comprising a first valve housing an internal fluid circuit, the device comprising a second valve comprising an internal circuit and forming a physical entity distinct from the first valve, the first and the second valve comprising respective coupling members forming a detachable
male/female quick-connection system for the second valve on the first valve, the two valves being configured such as to place their internal circuits in communication when the second valve is coupled to the first valve via the quick-connection system, the internal circuits comprising an array of control valve(s) for controlling the circulation of the fluid towards an outlet the device comprising at least one manually actuatable movable command member for commanding the array of control valve(s) and/or the quick-connection system, the device comprising a member for purging one at least of the internal circuits, the purge member being in communication with the internal circuit or circuits on the one hand and with an exterior discharge zone, such as the atmosphere, on the other, the purge member being movable between a closed state preventing purging of the internal circuit or circuits towards the discharge zone and an open state allowing purging of the internal circuit or circuits towards the discharge zone, wherein the purge member comprises a check valve urged into a closure position against a seat by a return member, and in that the purge member can be actuated to its open state by the at least one manually actuatable movable command member, wherein the at least one manually actuatable movable command member comprises a pivoting lever, and in that the purge member may be actuated by means of mechanical contact with a portion of said lever.

4. The device according to claim 3, wherein the purge member may be actuated by the lever in the travel between two specific positions of command of the array of valve(s).

5. The device according to claim 3 wherein the purge member may be actuated by the lever when the lever is moved beyond the travel between two specific positions of command of the array of valve(s).

* * * * *